US011872452B2

(12) United States Patent
Wolfinbarger

(10) Patent No.: US 11,872,452 B2
(45) Date of Patent: Jan. 16, 2024

(54) TWO LAYER RECREATIONAL AIR-TIGHT OBJECT HAVING A PATTERNED ILLUMINATED SURFACE

(71) Applicant: GIGGLICIOUS, LLC, Avon, IN (US)

(72) Inventor: Ryan Wolfinbarger, Avon, IN (US)

(73) Assignee: GIGGLICIOUS, LLC, Avon, IN (US)

( * ) Notice: Subject to any disclaimer, the term of this patent is extended or adjusted under 35 U.S.C. 154(b) by 0 days.

(21) Appl. No.: 18/068,899

(22) Filed: Dec. 20, 2022

(65) Prior Publication Data

US 2023/0191205 A1 Jun. 22, 2023

Related U.S. Application Data

(63) Continuation of application No. 17/558,531, filed on Dec. 21, 2021, now Pat. No. 11,534,662, which is a (Continued)

(51) Int. Cl.

| | |
|---|---|
| ***A63B 43/06*** | (2006.01) |
| ***A63B 41/00*** | (2006.01) |
| ***A63B 45/00*** | (2006.01) |
| ***F21V 3/02*** | (2006.01) |
| *A63B 37/12* | (2006.01) |

(52) U.S. Cl.

CPC .............. *A63B 41/00* (2013.01); *A63B 43/06* (2013.01); *A63B 45/00* (2013.01); *F21V 3/026* (2013.01); *A63B 37/12* (2013.01); *A63B 2220/803* (2013.01); *A63B 2225/74* (2020.08); *A63B 2243/007* (2013.01); *A63B 2243/0025* (2013.01)

(58) Field of Classification Search

CPC ...... A63B 2225/74; A63B 43/06; F21V 3/026
See application file for complete search history.

(56) References Cited

U.S. PATENT DOCUMENTS 5,403,000 A 4/1995 Woosley
6,666,782 B1 12/2003 Wu
(Continued)

FOREIGN PATENT DOCUMENTS

CN 201040166 Y 3/2008
CN 201227503 Y 6/2008
(Continued)

OTHER PUBLICATIONS

CN202210167592.0—Office Action dated Aug. 2, 2023.
(Continued)

*Primary Examiner* — Sean P Gramling
(74) *Attorney, Agent, or Firm* — AIRD & MCBURNEY LP

(57) ABSTRACT

In an aspect, an apparatus is provided and includes an air-tight object having an outer layer, an inner layer, and a cover, and a light module. The opacity of the outer layer is greater than the opacity of the inner layer. The outer layer defines a first aperture and a second aperture. The inner layer and the cover define a first interior region. The inner layer defines a second interior region. The light module is encapsulated within the first interior region and is configured to send light through the inner layer, through the second interior region of the air-tight object, and through the second aperture of the outer layer, wherein the cover is disposed between the light module and the outer layer.

9 Claims, 13 Drawing Sheets

Related U.S. Application Data continuation of application No. 17/069,759, filed on Oct. 13, 2020, now Pat. No. 11,202,940, which is a continuation of application No. 14/663,245, filed on Mar. 19, 2015, now Pat. No. 10,799,769.

(56) References Cited

U.S. PATENT DOCUMENTS

| | | | | |
|---|---|---|---|---|
| 6,733,149 | B1 | 5/2004 | Chuang | |
| 2011/0136604 | A1 * | 6/2011 | Hsu | A63B 41/00<br>473/609 |

FOREIGN PATENT DOCUMENTS

| | | | |
|---|---|---|---|
| CN | 202637991 | U | 1/2013 |
| CN | 202844596 | U | 4/2013 |
| JP | 3058122 | U | 6/1999 |
| JP | 2008017993 | A | 1/2008 |

OTHER PUBLICATIONS

English Translation of CN202210167592.0—Office Action dated Aug. 2, 2023.
CN201227503—English Translation.
CN202844596—English Translation.
CN201040166—English Translation.
CN202637991—English Translation.
JP2008017993—English Translation.
JP3058122—English Translation.

* cited by examiner

System 100

500

800

900

1000

1100

1200

TWO LAYER RECREATIONAL AIR-TIGHT OBJECT HAVING A PATTERNED ILLUMINATED SURFACE

CROSS-REFERENCE TO RELATED APPLICATIONS

This application is a continuation of U.S. patent application Ser. No. 17/558,531 filed Dec. 21, 2021, which is a continuation of application Ser. No. 17/069,759, filed Oct. 13, 2020, which is a continuation of application Ser. No. 14/663,245, filed Mar. 19, 2015, the contents of which are incorporated herein in their entirety.

BACKGROUND OF THE DISCLOSURE

Embodiments described herein relate generally to sporting goods and toy products, and more particularly to a ball such as a game ball or play ball that is an air-tight object having a patterned illuminated surface.

Recreational balls and toys that stimulate ball play are very popular. Many consumers of recreational balls and toy products may desire to use recreational balls and toy products in darkened environments. Such recreational balls and toy products can include an illumination device that activates in reaction to user input, such as when the recreational ball or toy product is bounced, tossed, spun, kicked, or caught. Such recreational balls and toy products, however, are often difficult to assemble, include unnecessary parts and do not provide distinctive illumination patters. Thus, a need exists for improved recreational balls and toy products.

SUMMARY OF THE DISCLOSURE

Systems, apparatus, and methods related to recreational balls with patterned illuminated surfaces are described herein. In some embodiments, an apparatus includes an air-tight object having an outer layer and an inner layer. The opacity of the outer layer is greater than the opacity of the inner layer. The outer layer defines an aperture. Additionally, a light module is configured to send light from an interior of the air-tight object through the aperture of the outer layer.

DETAILED DESCRIPTION

Systems, apparatus and methods related to an air-tight ball are described herein. In some embodiments, an apparatus includes an air-tight object having an outer layer, an inner layer, and a light module. The opacity of the outer layer is greater than the opacity of the inner layer, and the outer layer defines at least one aperture. The light module is configured to send light from an interior of the air-tight object through the at least one aperture defined by the outer layer. The light sent from the light module passes through the aperture(s) defined by the outer layer, defining an illuminated shape or pattern on the surface of the air-tight object. As a result, the air-tight object is aesthetically pleasing and can be identified in darkened environments.

The light module can also emit light in reaction to a user input. For example, the light module can include a shake sensor that can be activated by the user impacting or moving the air-tight object. The impacting or moving of the air-tight object can include bouncing, tossing, spinning, kicking, or catching. Activation of the shake sensor can result in the light module emitting light, and the light module may emit light according to a pre-programmed sequence.

It is desirable for the air-tight objects to be made inexpensively. It is also desirable for the air-tight objects to be sufficiently soft to be safe, but to be sufficiently durable for recreational play.

The term "inflatable" is used herein in reference to an object that is capable of being filled, at least partially with air, gas or fluid; such an object can have, for example, a valve through which the air, gas or fluid is inserted. The term "air-tight" is used herein in reference to an object having an interior cavity that prevents an air, gas or fluid to escape or pass through; such an object can be formed, for example, with a valve or formed without a valve, capturing air, gas or fluid included at formation. The term "inflated" is used herein in reference to an object that is distended with air, gas or fluid.

Figure 1:
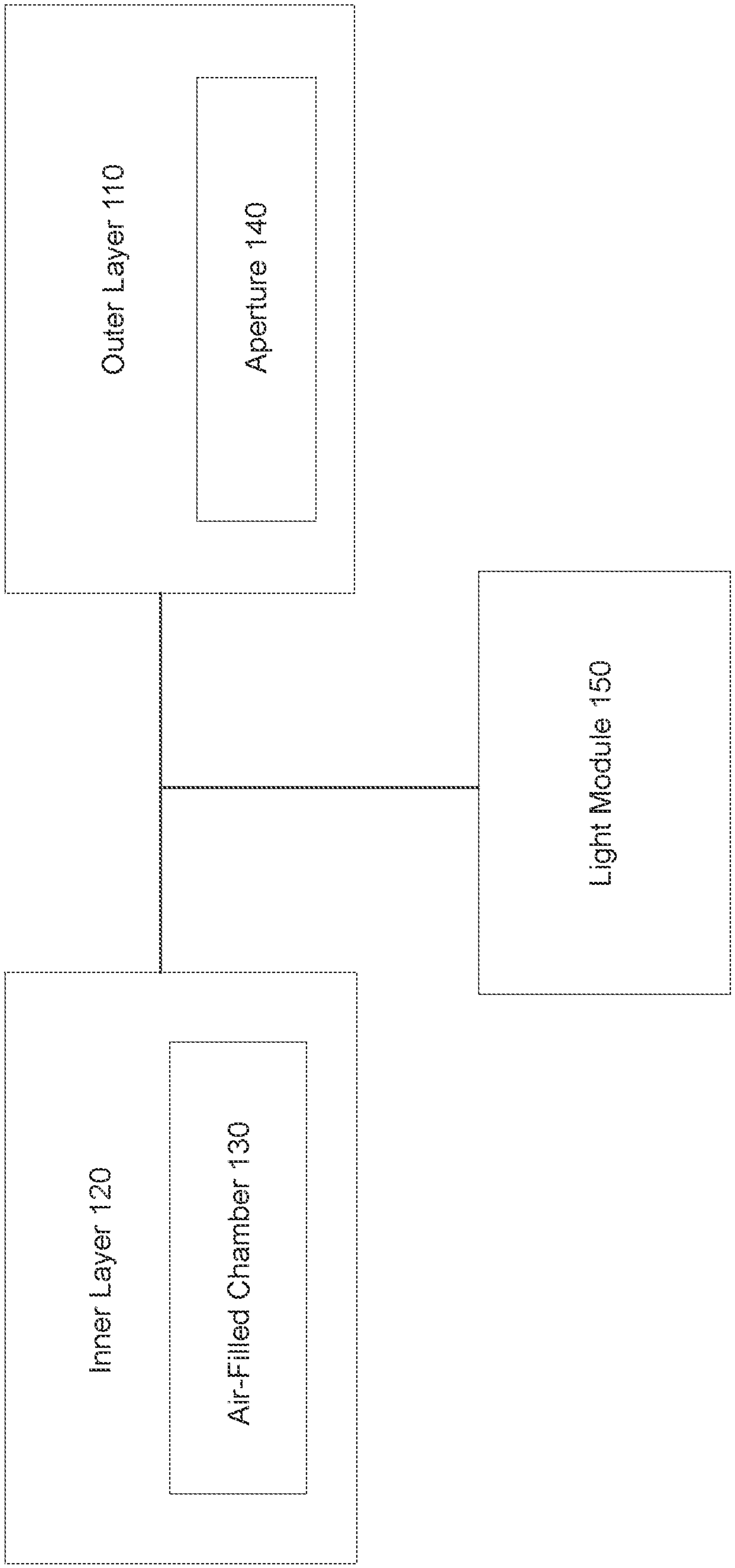
FIG. 1 is a schematic illustration of a system according to an embodiment.

FIG. 1 is a schematic illustration of a system 100 according to an embodiment. The system 100 includes an outer layer 110 defining at least one aperture 140. An inner layer 120 defines an air-tight chamber 130. A light module 150 is configured to send light through the at least one aperture 140 of the outer layer 110. The light module 150 may be located in the air-tight chamber 130, and can be attached to the inside surface of the inner layer 120 or freely movable within the air-tight chamber 130. Alternatively, the light module 150 may be encapsulated within the inner layer 120 or the outer layer 110. The light module 150 may also be located between the outer layer 110 and the inner layer 120.

The outer layer 110 has a greater opacity than the inner layer 120. As a result, the outer layer 110 restricts the passage of light emitted by the light module 150 through the outer surface of the system 100, except through the at least one aperture 140. The light that passes through the at least one aperture 140 defines an illuminated shape or pattern on the outer surface of the system 100. The at least one aperture 140 can be empty or can be filled with a transparent or translucent material.

The outer layer 110, as well as the outer layers of some or all of the embodiments described herein, can be made of paint, thermoplastic rubber, thermoplastic urethane, thermoplastic elastomer, polyvinyl chloride, foam, latex, thermoset rubber, thermoset elastomers, thermoplastic vulcanizate (TPV), natural rubber, synthetic rubber, styrene-butadiene-styrene (SBS), styrene-butadiene-rubber (SBR), styrene-ethylene-butadiene-rubber (SEBS), ethylene-propylene monomer (EPM), ethylene-propylene-diene monomer (EPDM), polychloroprene (neoprene), polydimethyl siloxane (silicone), or any other appropriate material or any combination thereof.

The inner layer 120, as well as the inner layers of some or all of the embodiments described herein, can be made of polyvinyl chloride (PVC), thermoplastic rubber, thermoplastic urethane, or any other appropriate material or any combination thereof. Such a PVC can have, for example, a 60 Shore A hardness.

The surface of the outer layer 110 of the system 100, as well as the surfaces of the outer layers of some or all of the embodiments described herein, can be formed with particular materials or texture to increase the grip of the system 100 by the user. The surface of the outer layer 110, as well as the surfaces of the outer layers of some or all of the embodiments described herein, can be embossed and/or debossed. The surface of the outer layer 110 can also be, for example, a textured surface configured to improve a user's grip and to diffuse the light emitted by light module 150.

Figure 2:
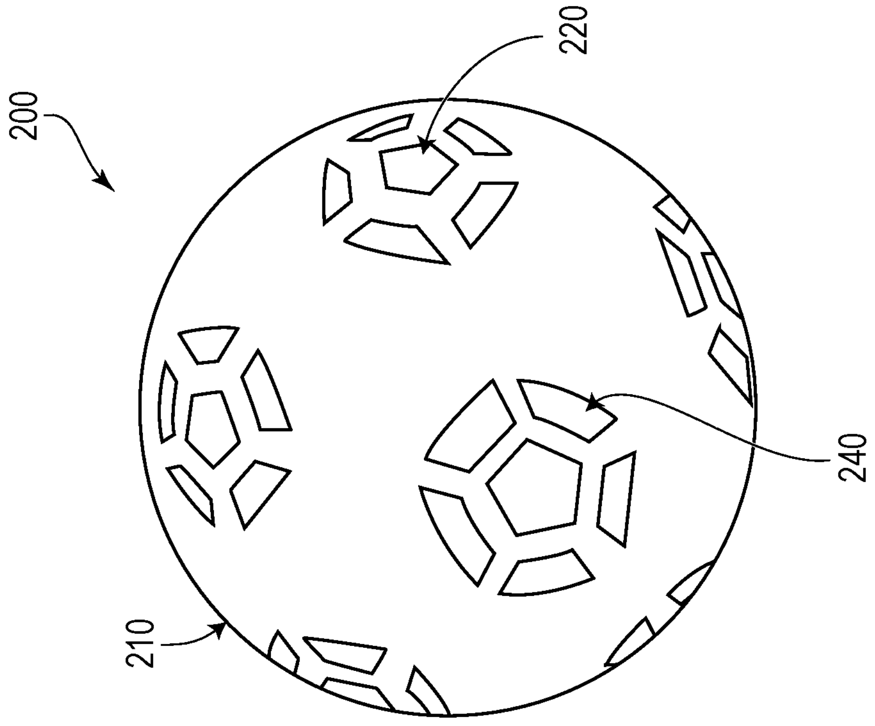
FIG. 2 is a perspective view of a round ball according to an embodiment.

FIG. 2 is a perspective view of a round ball 200 according to an embodiment. Round ball 200 includes an outer layer 210 and an inner layer 220. The outer layer 210 has a greater opacity than the opacity of the inner layer 220. The outer layer 210 defines apertures 240. In FIG. 2, the round ball 200 is shown in an illuminated configuration. In the illuminated configuration, light travels from a light module (not shown) located within the round ball 200, through the inner layer 220, and out of the apertures 240. The opacity of the 240, defining an illuminated pattern on the surface of the round ball 200. The illuminated pattern can, for example, be defined by the illumination of a number of faces of a typical soccer ball, which is shaped as a spherical polyhedron.

Figure 3:
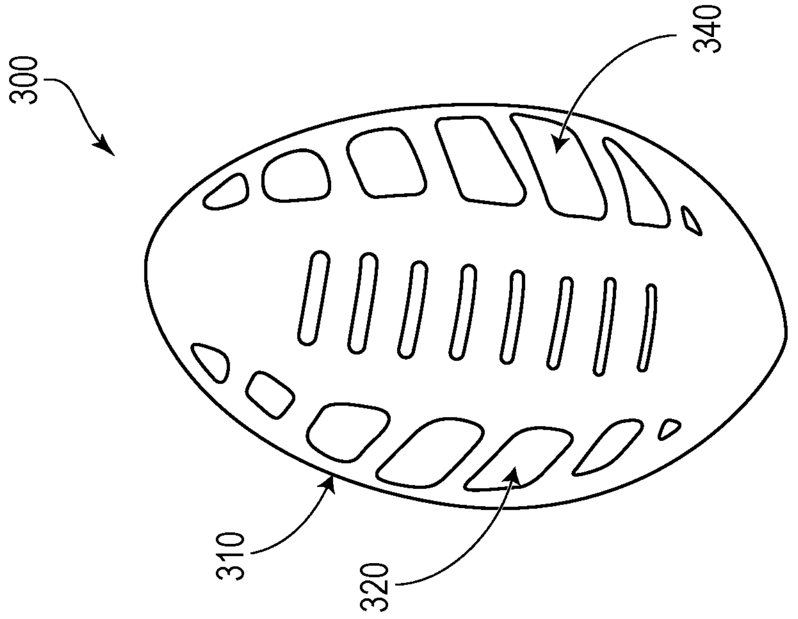
FIG. 3 is a perspective view of a football according to an embodiment.

FIG. 3 is a perspective view of a football 300 according to an embodiment. The football 300 includes an ovular cross-section in a first plane (not shown), and a circular cross-section in a second plane perpendicular to the first plane (not shown). Similar to round ball 200, shown in FIG. 2, football 300 includes an outer layer 310 and an inner layer 320. The outer layer 310 has a greater opacity than the opacity of the inner layer 320. The outer layer 310 defines apertures 340. In FIG. 3, the football 300 is shown in an illuminated configuration. In the illuminated configuration, light travels from a light module (not shown) located within the football 300, through the inner layer 320, and out of the apertures 340. The opacity of the outer layer 310 restricts the light emitted by the light module from exiting the outer surface of the football 300 through the outer layer 310. Light, however, is allowed to travel through the apertures 340, creating an illuminated pattern on the surface of the football 300. The apertures 340 can be arranged so that the illuminated pattern defines, for example, an illuminated pattern representing a stitching pattern.

Figure 4:
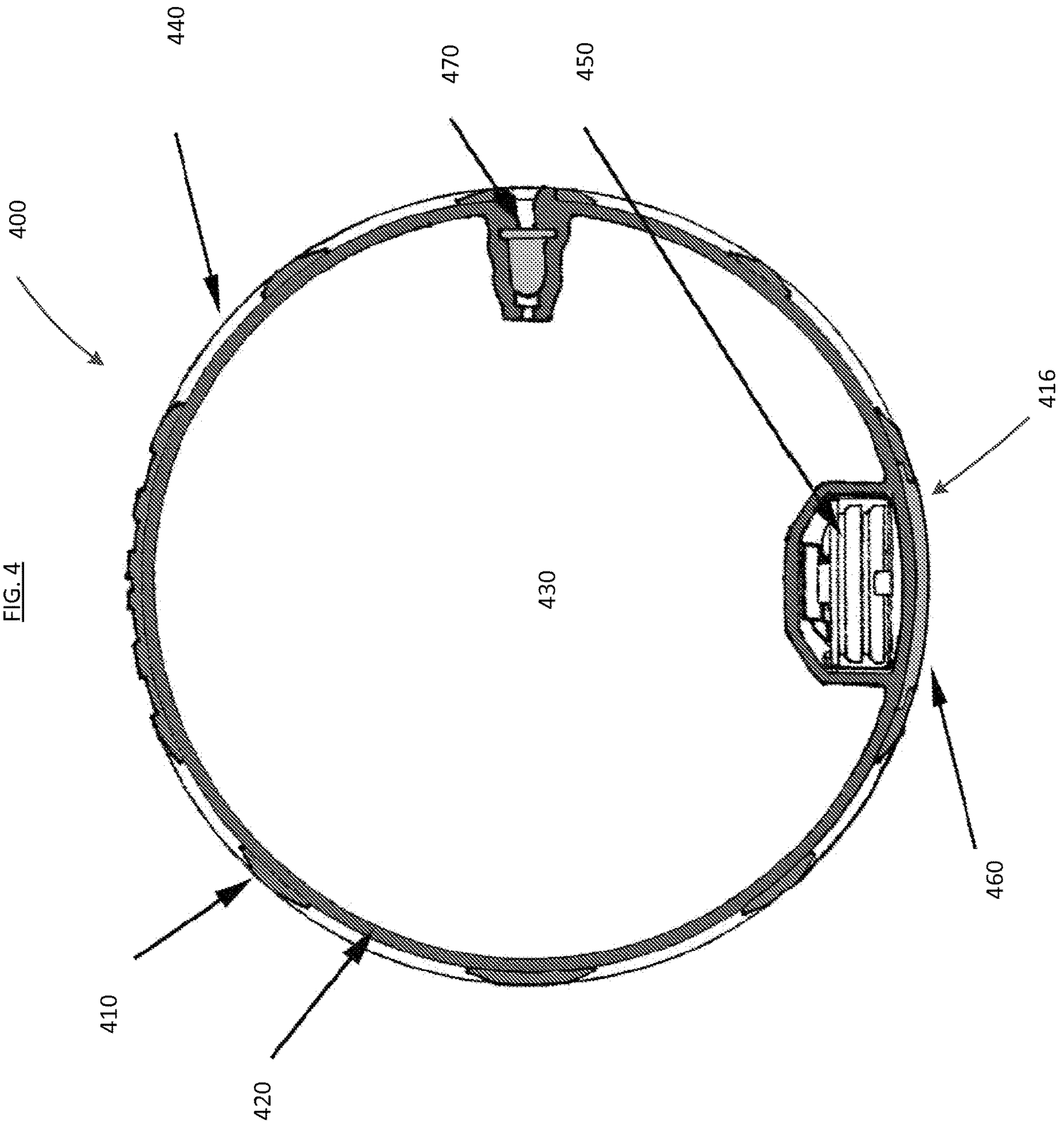
FIG. 4 is a cross-sectional view of an air-tight object according to an embodiment.

FIG. 4 is a cross-sectional view of an air-tight object 400 according to an embodiment. The air-tight object 400 includes an outer layer 410 and an inner layer 420. The inner layer 420 defines an inflation chamber 430. The outer layer 410 defines at least one aperture 440. The outer layer 410 has a greater opacity than the opacity of the inner layer 420. The air-tight object 400 also includes a light module 450. The light module 450 is encapsulated by the inner layer 420. The light module 450 is configured to send light through the portion of the inner layer 420 encapsulating the light module 450, through the inflation chamber 430, and through the at least one aperture 440. The light emitted from light module 450 will define an illuminated shape or pattern on the surface of the air-tight object 400 as a result of light being obstructed by the outer layer 410 but being able to travel through apertures 440. The air-tight object 400 can also include a valve 470 for inflating the inner layer 420.

The air-tight object 400 can also include a cover 460. The cover 460 can be configured to protect the inner layer 420 and the light module 450 after the inner layer 420 and the light module 450 have been arranged within the outer layer 410. The cover 460 can be configured to fill or be disposed in an opening 416 of the outer layer 410. A method of assembling the air-tight object 400 can include inserting the inner layer 420 including the light module 450 through the opening 416. The cover 460 can then be inserted into the opening 416 to define a smooth or substantially smooth outer surface of the air-tight object 400 in the area of opening 416.

Alternatively, the cover 460 may not be included. In a configuration without the cover 460, the opening 416 in the outer layer 410 may be left open. Additionally, depending on the assembly method, the cover 460 may be omitted due to the lack of an opening like opening 416. Examples of assembly methods that may not include the opening 416 include methods described below where the outer layer is attached to the inner layer by spraying, overmolding, or gluing the outer layer over the inner layer.

Figure 5:
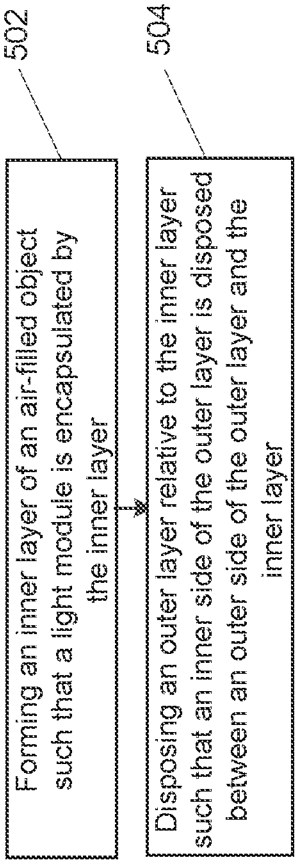
FIG. 5 is a flow chart of a method of assembling an air-tight object according to an embodiment.

FIG. 5 is a method of assembling an air-tight object, such as the air-tight object 400 of FIG. 4, according to an embodiment. An inner layer of an air-tight object is formed such that a light module is encapsulated by the inner layer, at 502. Then, an outer layer is disposed relative to the inner layer such that an inner side of the outer layer is disposed between an outer side of the outer layer and the inner layer, at 504. The opacity of the outer layer is greater than the opacity of the inner layer. The outer layer defines an aperture.

The outer layer can be disposed relative to the inner layer, for example, by attaching the outer layer to the inner layer by spraying, overmolding, or gluing the outer layer over the inner layer, or any combination thereof. Alternatively, the outer layer can be stretched over the inner layer.

Alternatively, the inner layer, in a deflated configuration, together with the light module can be inserted through an opening in the outer layer. The inner layer can then be inflated within the outer layer. A cover may be inserted into the opening in the outer layer to fill the opening.

Figure 6A:
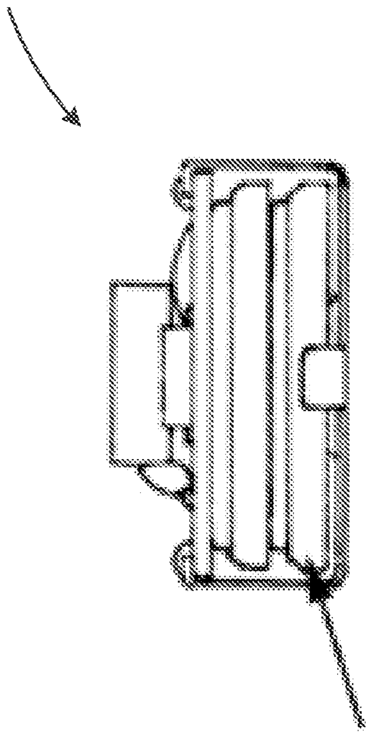
FIG. 6A is a side view of a light module according to an embodiment.
Figure 6B:
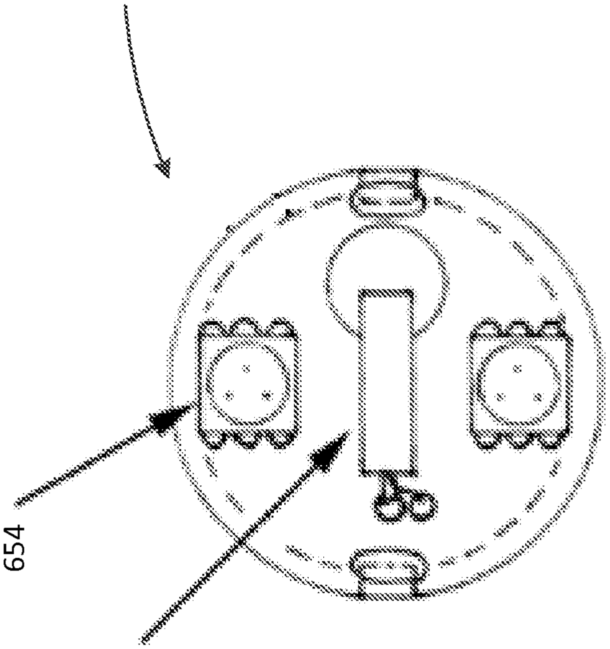
FIG. 6B is a top view of a light module shown in FIG. 6A.

FIG. 6A is a side view of a light module 650 according to an embodiment. FIG. 6B is a top view of the light module 650 of FIG. 6A. As shown in FIGS. 6A and 6B, a light module 650 can include a shake sensor 656, at least one light emitting diode 654, and at least one battery 652. The shake sensor 656 can be configured to control the activation of the light emitting diode 654. If the shake sensor 656 senses an impact or change in motion, the shake sensor 656 will activate the light emitting diode 654. The impact or change in motion can include being tapped, hit, bounced, spun, caught or other actions. The light module 650 can include control electronics to control the operation of the light emitting diode 654. The light emitting diode 654 can be configured to illuminate according to a sequence of fading bursts of light. For example, upon impact, the light emitting diode 654 can first burst light at 100% brightness, fade to 50% brightness within 1 second, and then fade to 25% brightness over 2 minutes. This allows the user time to locate the light module 650 and any associated components in a darkened environment. After 2 minutes at 25% brightness, the light emitting diode 654 can fade to 0% brightness over 5 seconds to save power. If, during the sequence of fading bursts of light, the light module 650 experiences another impact or change in motion, the sensor shake 656 can be reactivated and cause the sequence of fading bursts of light to restart at 100% brightness. The ability to reactivate the sequence of fading bursts of light defines an effect that encourages a user to continue using the light module and associated components, while also assisting the user in identifying the location of the light module and associated components in a dark environment. The at least one battery 652 can be two piece CR2032 batteries, or any other battery or combination of batteries that can power the light module 650. The at least one light emitting diode 654 can be mounted on the surface of the light module 650. While the embodiment of FIGS. 6A and 6B show a particular arrangement of the light module 650, any alternative suitable light generation components can be included. Additionally, any desired brightening or fading light sequences may be included.

Figure 7:
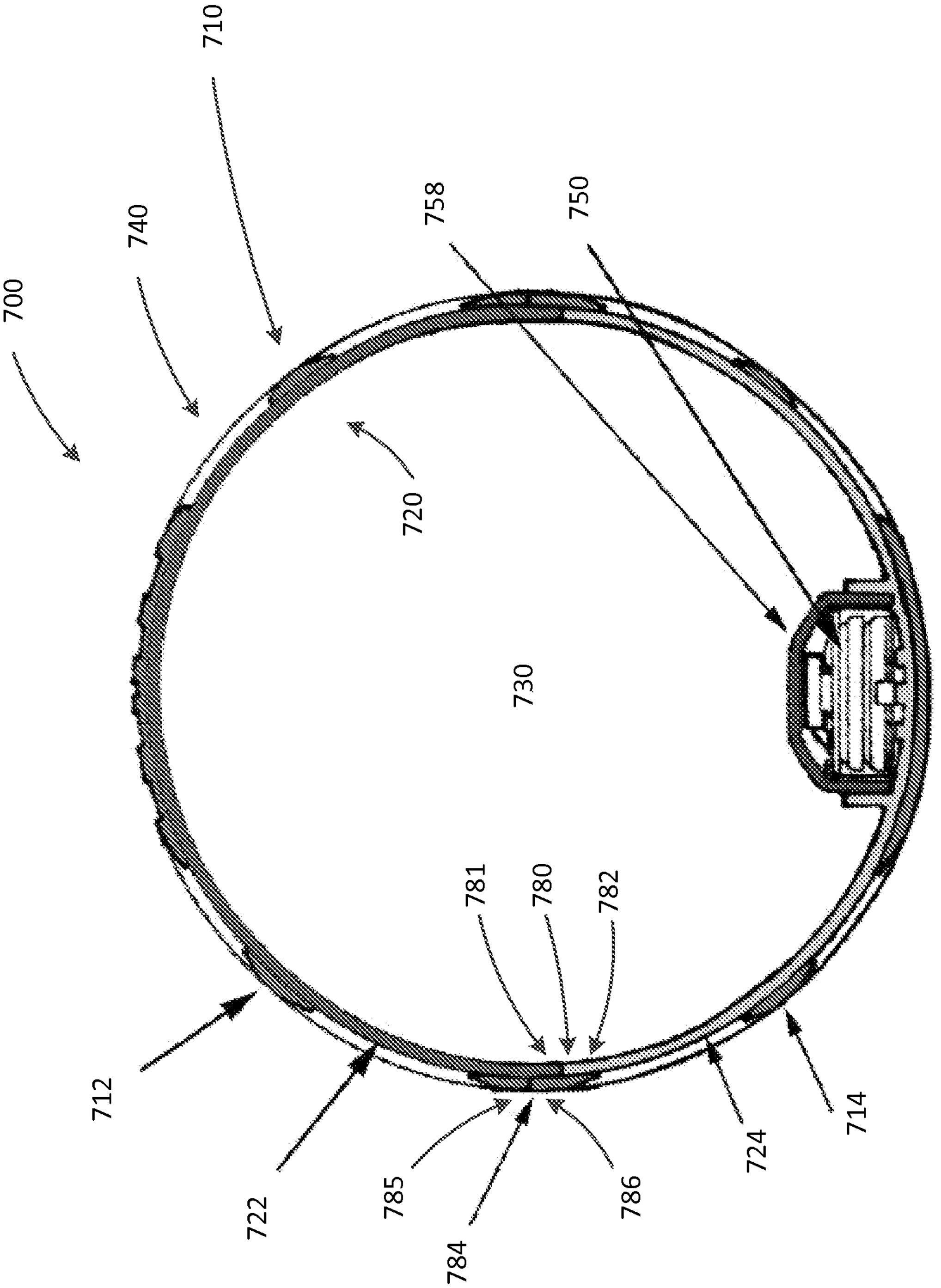
FIG. 7 is a cross-sectional view of an air-tight object according to an embodiment.

FIG. 7 is a cross-sectional view of an air-tight object 700 according to an embodiment. The air-tight object 700 includes an outer layer 710 and an inner layer 720. The opacity of the outer layer 710 is greater than the opacity of the inner layer 720. The outer layer 710 defines at least one aperture 740. The inner layer 720 includes an inner layer first portion 722 and an inner layer second portion 724. The inner layer first portion 722 and the inner layer second portion 724 are mutually exclusive from each other. The inner layer first portion 722 has an inner layer first edge 781. The inner layer second portion 724 has an inner layer second edge 782. The inner layer first portion 722 and the inner layer second portion 724 are configured to be coupled along the inner layer first edge 781 and the inner layer second edge 782, forming a first seam 780. When the inner layer first portion 722 and the inner layer second portion 724 are coupled along the first seam 780, the inner layer first portion 722 and the inner layer second portion 724 form a substantially smooth outer surface of the inner layer 720 and define chamber 730. The first seam 780 can be sealed, for example, by glue, ultrasonic welding, solvent welding, or any other suitable attachment means.

The inner layer 720 can include an inflation valve for inflation of the chamber 730. Alternatively, the chamber 730 may not require inflation and can be filled with the air that is captured when the inner layer first portion 722 and the inner layer second portion 724 are coupled during assembly.

The inner layer first portion 722 and the inner layer second portion 724 can be formed substantially as hemispheres. The inner layer first edge 781 and the inner layer second edge 782 can be coupled along the first seam 780 to form a substantially spherical outer surface. Alternatively, the inner layer first portion 722 and the inner layer second portion 724 can be formed in a variety of other shapes, such as shapes with an ovular seam for the air-tight object to form, for example, a football shape. The inner layer 720 can be made of, for example, thermoplastic rubber, thermoplastic polyurethane, thermoplastic elastomer, polyvinyl chloride, ethylene-vinyl acetate, foam, or any other suitable material.

A light module 750 can be configured to be connected to the inner surface of the inner layer first portion 722 or the inner layer second portion 724. A light module cover 758 can engage with the inner surface of the inner layer first portion 722 or the inner layer second portion 724 to secure the light module 750 to the inner layer first portion 722 or the inner layer second portion 724. The light module cover 758 can engage with the inner layer first portion 722 or the inner surface of the inner layer second portion 724 via, for example, a threaded engagement, a snap-fit, a friction-fit, an adhesive, or any other suitable engagement mechanism or combination of engagement mechanisms. The light module cover 758 can engage with the inner layer first portion 722 or the inner surface of the inner layer second portion 724, for example, at a recess within the inner layer first portion 722 or the inner surface of the inner layer second portion 724. The light module cover 758 can be, for example, translucent. The light module 750 can be configured to send light through the light module cover 758, the chamber 730, the inner layer 720, and the at least one aperture 740. Due to being more opaque than the inner layer 720, the outer layer 710 restricts more light from passing out of the chamber 730 than the inner layer 720. As a result, the air-tight object 700 has an illuminated shape or pattern on the surface of the air-tight object 700 in the areas of the at least one aperture 740.

Alternatively, the light module 750 can be freely movable within the chamber 730 and to the inner layer 720. The light module 750 can be self-enclosed in a housing (not shown) that is detached from the inner surface of the inner layer 720. An example of this type of light module is described below with reference to light module 1250 in FIG. 12.

As shown in FIG. 7, the outer layer 710 of the air-tight object 700 includes an outer layer first portion 712 and an outer layer second portion 714. At least one of the outer layer first portion 712 and the outer layer second portion 714 includes the at least one aperture 740. The outer layer first portion 712 has an outer layer first edge 785. The outer layer second portion 714 has an outer layer second edge 786. The outer layer first portion 712 and the outer layer second portion 714 are coupled along the outer layer first edge 785 and the outer layer second edge 786, forming a second seam 784. When the outer layer first portion 712 and the outer layer second portion 714 are coupled along the second seam 784, the outer layer first portion 712 and the outer layer second portion 714 form a substantially smooth outer surface of the outer layer 710. The second seam 784 can be sealed by glue, ultrasonic welding, solvent welding, or any other suitable attachment means. Although the outer layer 710 is shown in FIG. 7 as having relatively large apertures spaced apart by relatively large outer layer portions 712 and 714, in other embodiments the apertures can be relatively small and spaced apart by relatively small outer layer portions to define an overall mesh-like appearance.

In some embodiments, the outer layer of the air-tight object can be disposed over the inner layer by being sprayed, overmolded or glued over the inner layer. Alternatively, the outer layer can be monolithically formed separately and then stretched over the inner layer. In yet another embodiment, the outer layer can be painted onto the inner layer.

Figure 8:
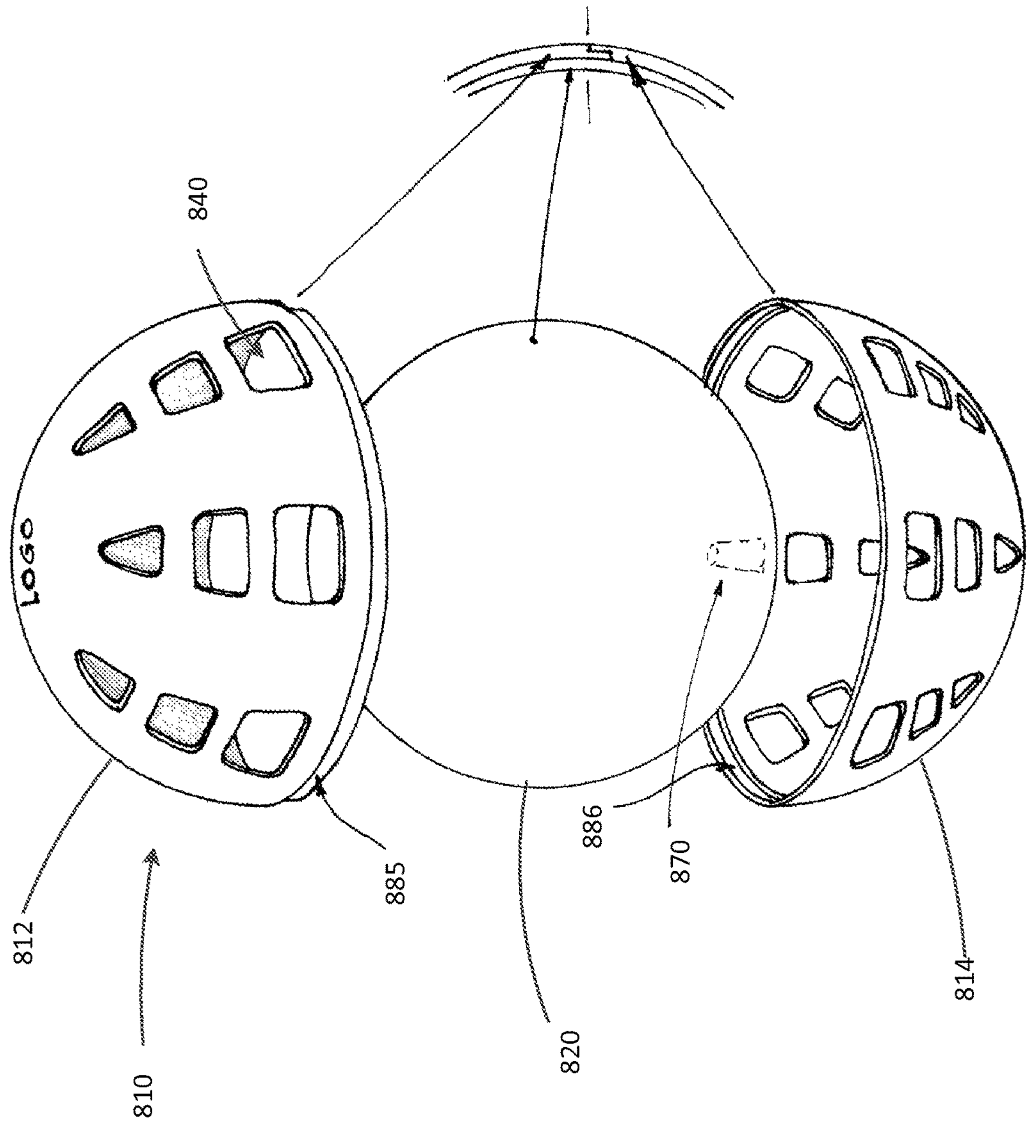
FIG. 8 is an exploded view of an air-tight object according to an embodiment.

FIG. 8 is an exploded view of an air-tight object 800 according to an embodiment. The air-tight object 800 includes an outer layer 810 and an inner layer 820. The outer layer 810 defines at least one aperture 840 configured to allow the passage of light from a light module (not shown). The inner layer 820 defines an inflatable chamber (not shown). The air-tight object 800 includes an inflation valve 870 (shown in phantom) located within the inflatable chamber. The outer layer 810 includes a first portion 812 and a second portion 814 mutually exclusive from the first portion 812. The first portion 812 defines a first edge 885. The second portion 814 defines a second edge 886. The first portion 812 and the second portion 814 are configured to be coupled along the first edge 885 and the second edge 886 to form a substantially smooth outer surface of the outer layer 810.

Figure 9:
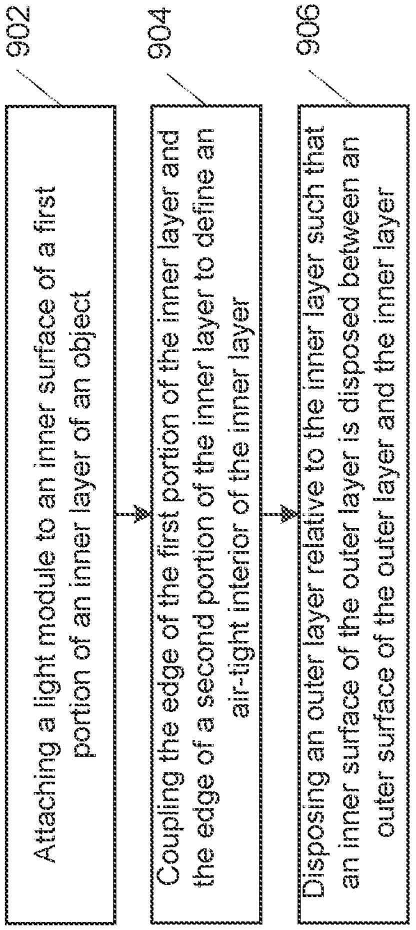
FIG. 9 is a flow chart of a method of assembling an air-tight object according to an embodiment.

FIG. 9 is a method of assembling an air-tight object, such as the air-tight object 700 shown in FIG. 7, according to an embodiment. The method includes attaching a light module to an inner surface of a first portion of an inner layer of an object, at 902. The inner layer includes a second portion mutually exclusive from the first portion. The first portion of the inner layer defines an edge, and the second portion of the inner layer defines an edge. The edge of the first portion of the inner layer is coupled to the edge of the second portion of the inner layer to define an air-tight interior of the inner layer, at 904. The outer layer is disposed relative to the inner layer (as discussed below) such that an inner surface of the outer layer is disposed between an outer surface of the outer layer and the inner layer, at 906. An opacity of the outer layer is greater than an opacity of the inner layer. The outer layer defines an aperture.

Coupling the edge of the first portion of the inner layer and the edge of the second portion of the inner layer can include, for example, ultrasonic welding, solvent welding, gluing, and/or using any other appropriate attachment technique to attach the edge of the first portion of the inner layer and the edge of the second portion of the inner layer.

The outer layer can include a first portion and a second portion mutually exclusive from the first portion of the outer layer. The first portion of the outer layer defines an edge. The second portion of the outer layer defines an edge. The disposing step of the method can include attaching the edge of the first portion of the outer layer to the edge of the second portion of the outer layer. The edge of the first portion of the outer layer and the edge of the second portion of the outer layer can be attached using ultrasonic welding, solvent welding, glue, or any other appropriate attachment means.

Alternatively, the outer layer can be disposed over the inner layer by being sprayed, overmolded, glued, or stretched over the inner layer. Alternatively, the outer layer can be monolithically formed separately and then stretched over the inner layer. In yet another embodiment, the outer layer can be painted onto the inner layer.

Figure 10:
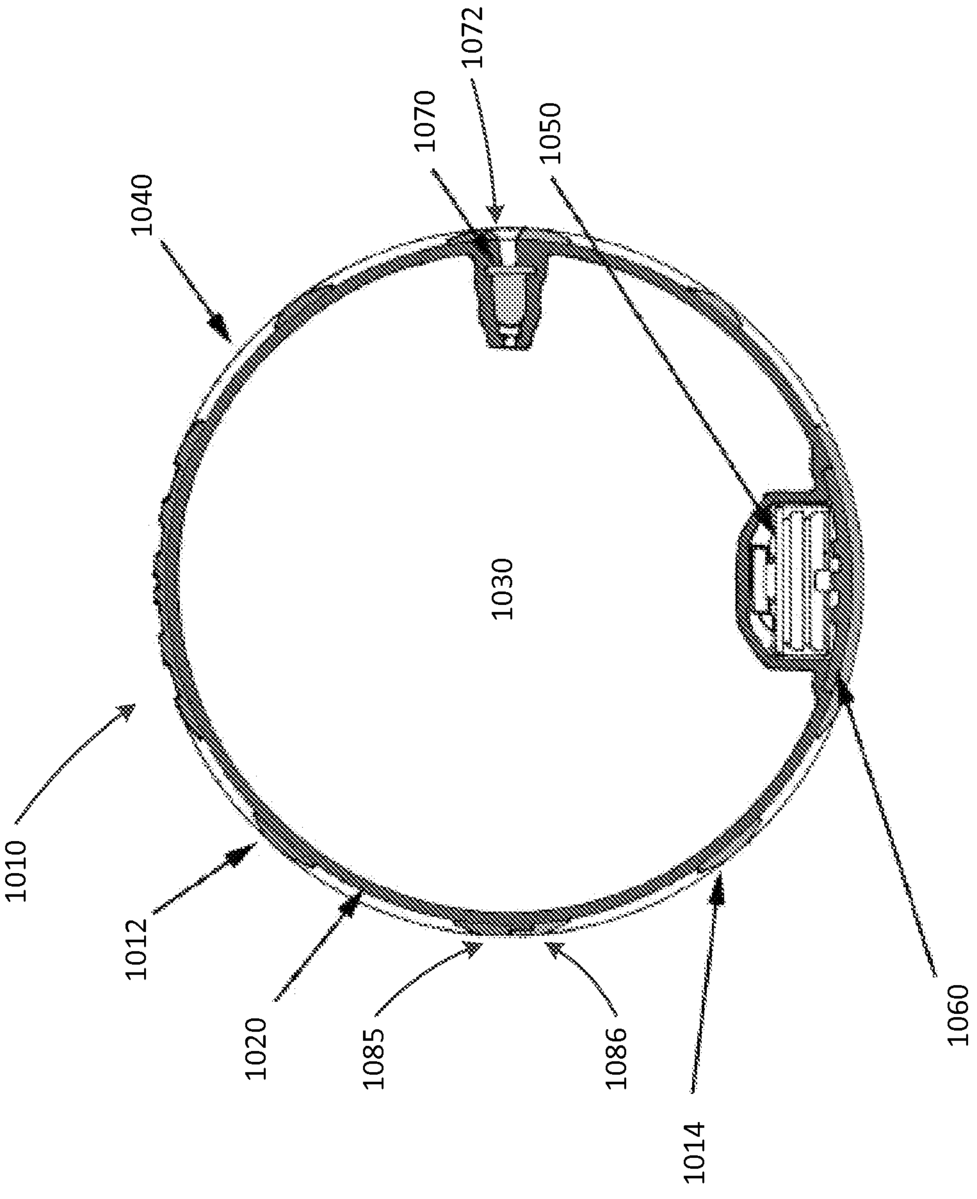
FIG. 10 is a cross-sectional view of an air-tight object according to an embodiment.

FIG. 10 is a cross-sectional view of an air-tight object 1000 according to an embodiment of the present disclosure. The air-tight object 1000 includes an outer layer 1010 and an inner layer 1020. The outer layer 1010 defines at least one aperture 1040. The inner layer 1020 defines an inflatable chamber 1030 and an inflation valve 1070. The outer layer 1010 includes a first portion 1012 and a second portion 1014 mutually exclusive from the first portion 1012. The first portion 1012 defines a first edge 1085. The second portion 1014 defines a second edge 1086. The first portion 1012 and the second portion 1014 are configured to be coupled along the first edge 1085 and the second edge 1086 to form a substantially smooth outer surface of the outer layer 1010. A valve casing opening 1072 is formed between the first edge 1085 and the second edge 1086 to provide access to the valve for inflation of the inflatable chamber 1030. A light module 1050 is disposed between the outer layer 1010 and the inner layer 1020. The light module 1050 is configured to emit light that passes through the inner layer 1020, the inflatable chamber 1030, and the at least one aperture 1040.

A cover 1060 is disposed between the light module 1050 and the outer layer 1020. The cover 1060 is configured to secure the light module 1050 relative to the inner layer 1020. The cover 1060 can also be configured to protect the light module 1050 from breakage if the outer layer 1010 is impacted during use.

Figure 11:
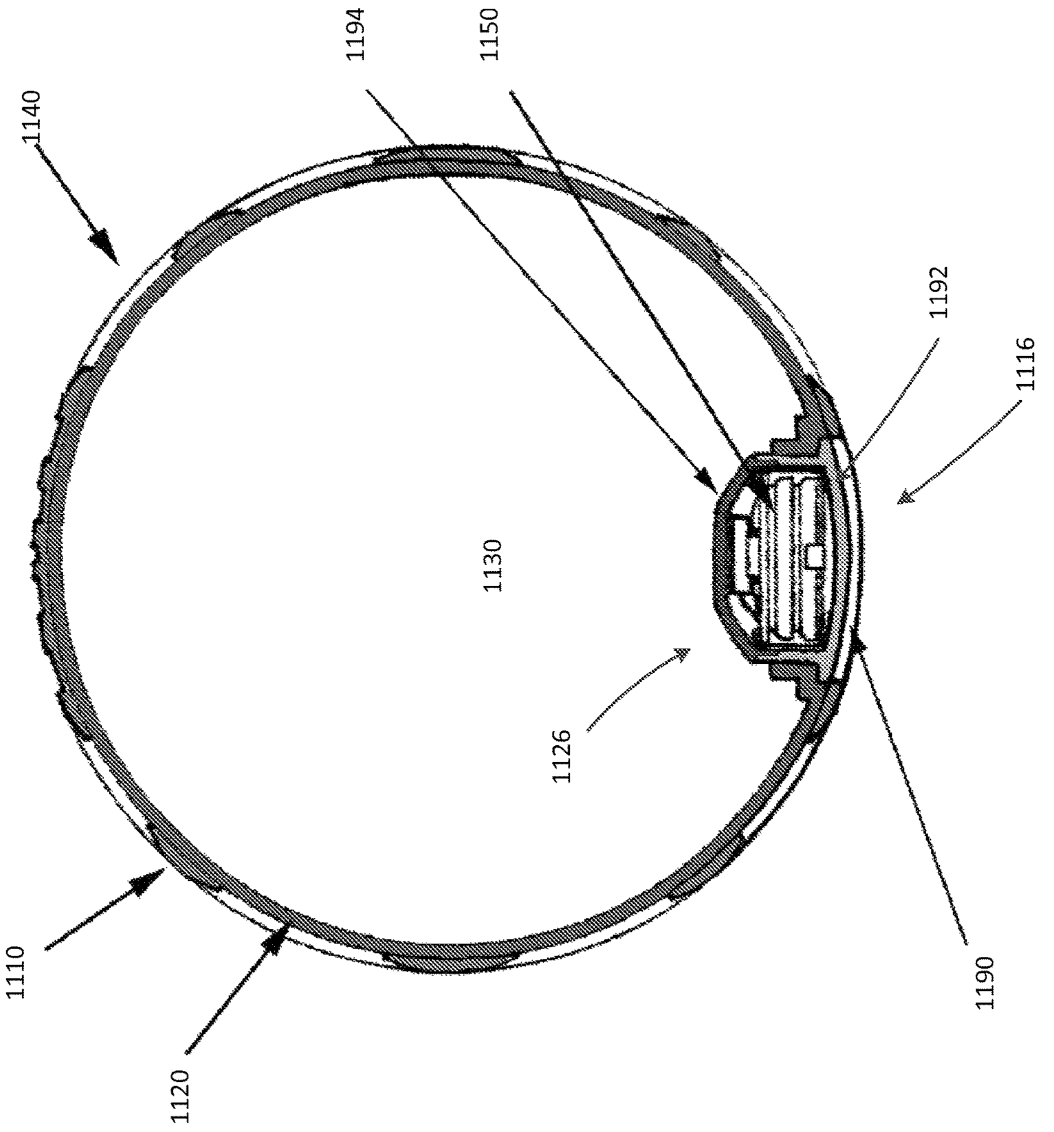
FIG. 11 is a cross-sectional view of an air-tight object according to an embodiment.

FIG. 11 is a cross-sectional view of an air-tight object 1100 according to an embodiment of the present disclosure. The air-tight object 1100 includes an outer layer 1110, an inner layer 1120, and a light module 1150. The outer layer 1110 defines at least one aperture 1140. The inner layer 1120 defines an air-tight chamber 1130. The outer layer 1110 defines an opening 1116 and the inner layer 1120 defines an opening 1126. The light module 1150 is contained within a core plug assembly 1190. Core plug assembly 1190 includes a base 1192 and a cover 1194. The core plug assembly 1190 is configured to be inserted through opening 1116 in the outer layer 1110 and to engage the inner layer 1120 so that the core plug assembly 1190 fills the opening 1126 in the inner layer 1120 to define chamber 1130 as being air-tight. The outer surface of the base 1192 of the core plug assembly 1190 is configured to engage with the inner layer 1120 to form a smooth, continuous outer surface of the inner layer 1120 and the core plug assembly 1190. The light module 1150 is configured to emit light that passes through the cover 1194, the air-tight chamber 1130, and the at least one aperture 1140.

Figure 12:
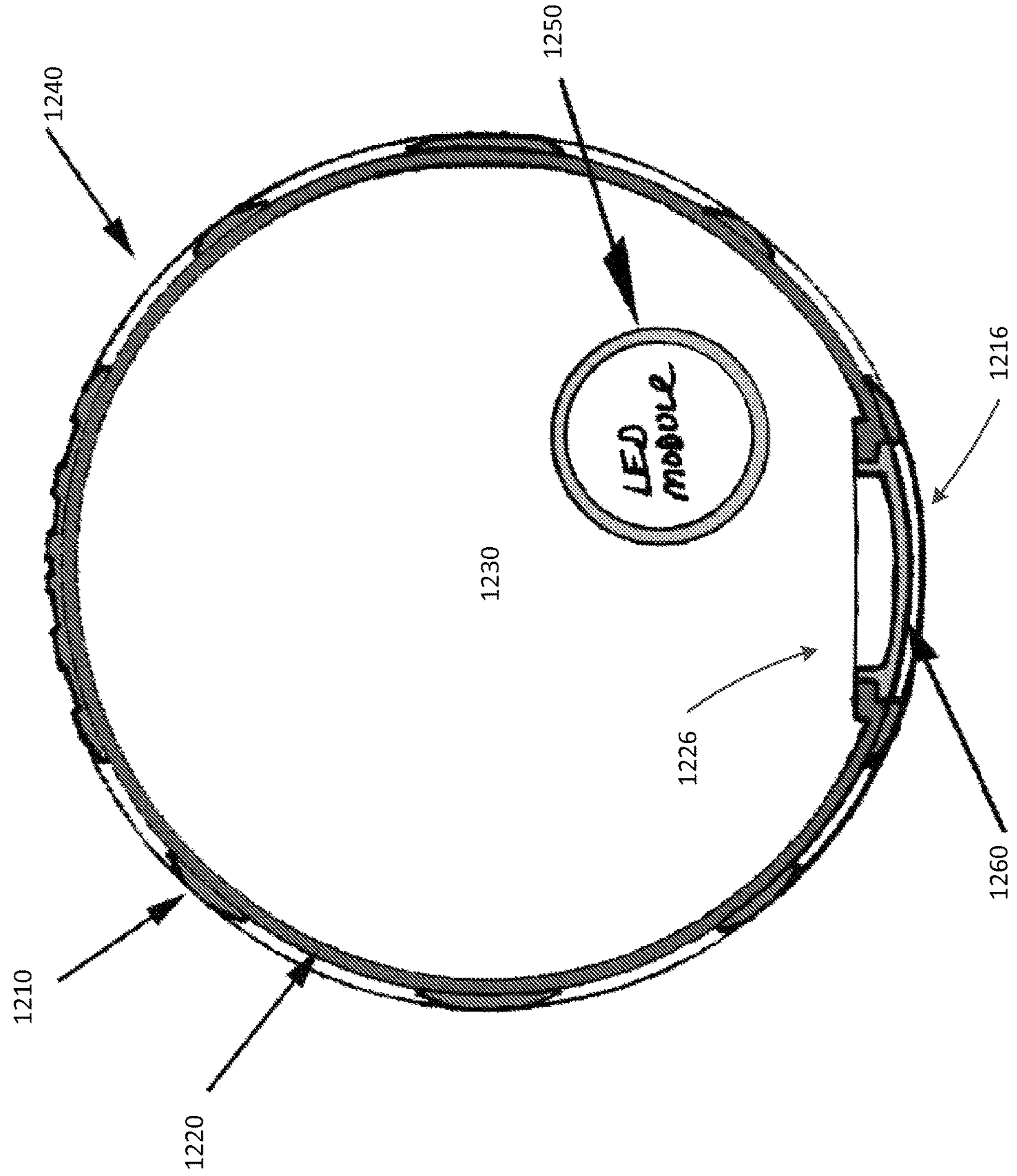
FIG. 12 is a cross-sectional view of an air-tight object according to an embodiment.

FIG. 12 is a cross-sectional view of an air-tight object 1200 according to an embodiment. The air-tight object 1200 includes an outer layer 1210 and an inner layer 1220. Inner layer 1220 defines an air-tight chamber 1230. A light module 1250 is located within the inner layer 1220. The light module 1250 can be freely movable within the air-tight chamber relative to the inner layer 1220. The outer layer 1210 defines at least one aperture 1240 and an opening 1216. The light module 1250 is configured to emit light that travels through the inner layer 1220 and through the at least one aperture defined by the outer layer 1210. The inner layer 1220 defines an opening 1226. Opening 1226 can allow for the light module 1250 to be inserted into the chamber 1230 after the manufacture of the inner layer 1220. A cover 1260 is configured to be inserted into the opening 1226 of the inner layer 1220. The cover 1260 can be configured to seal the opening 1226 and to form a smooth outer surface of the inner layer 1220 and the cover 1260.

Figure 13:
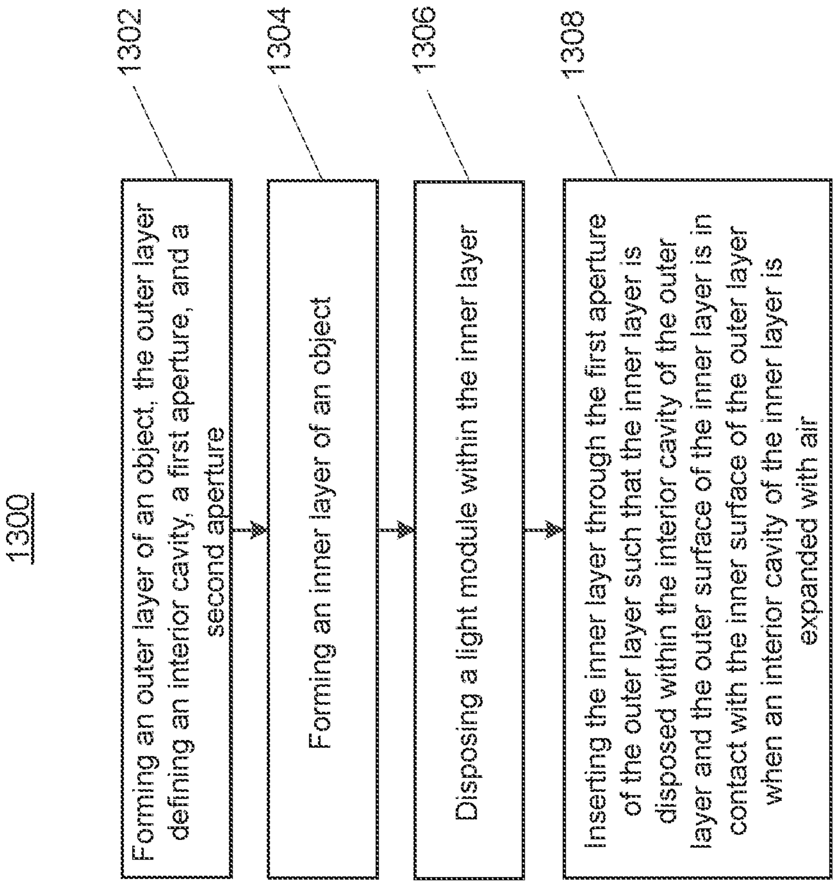
FIG. 13 is a flow chart of a method of assembling an air-tight object according to an embodiment.

FIG. 13 is a method 1300 of assembling an air-tight object, such as the air-tight object 400 shown in FIG. 4, according to an embodiment. Method 1300 includes forming an outer layer of an object, at 1302, such that the outer layer defines an interior cavity, a first aperture, and a second aperture. An inner layer of an object is formed, at 1304, such that an opacity of the outer layer is greater than an opacity of the inner layer. A light module is disposed within the inner layer, at 1306. The light module can be disposed within the inner layer by attaching the light module to a surface of the inner layer. The light module is configured to send light from an interior of the air-tight object through the aperture of the outer layer. The inner layer is inserted through the first aperture of the outer layer, at 1308, such that the inner layer is disposed within the interior cavity of the outer layer. When the interior cavity of the inner layer is expanded with air, the outer surface of the inner layer is in contact with the inner surface of the outer layer. After the inner layer is disposed within the interior cavity of the outer layer, a cover can be disposed within the first aperture. When the cover is disposed within the first aperture, the cover and a portion of the outer layer can form a substantially smooth outer surface of a portion of the outer layer including the cover.

Figure 14:
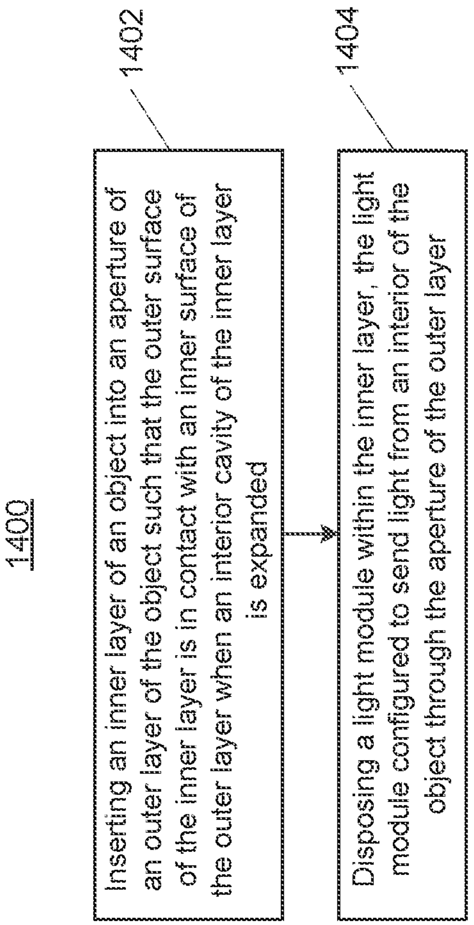
FIG. 14 is a flow chart of a method of assembling an air-tight object according to an embodiment.

FIG. 14 is a method 1400 of assembling an air-tight object, such as the air-tight object 1100 shown in FIG. 11 or the air-tight object 1200 shown in FIG. 12, according to an embodiment. Method 1400 includes inserting an inner layer of an object into an aperture of an outer layer of the object such that the outer surface of the inner layer is in contact with an inner surface of the outer layer when an interior cavity of the inner layer is expanded, at 1402. An opacity of the outer layer is greater than an opacity of the inner layer. A light module is disposed within the inner layer, at 1404. The light module is configured to send light from an interior of the object through the aperture of the outer layer.

While various embodiments have been described above, it should be understood that they have been presented in a way of example only, and not limitation. Where schematics and/or embodiments described above indicate certain components arranged in certain orientations or positions, the arrangement of components may be modified. While the embodiments have been particularly shown and described, it will be understood that various changes in form and details may be made. For example, the light module can be attached to the outer layer, more than one light module may be used, or using combinations of the embodiments described herein can create one or more alternate embodiments.

Although various embodiments have been described as having particular features and/or combinations of components, other embodiments are possible having a combination of any features and/or components form any of the embodiments as discussed above.

What is claimed is:

1. An apparatus, comprising:

an air-tight object having an outer layer, an inner layer, and a cover, an opacity of the outer layer being greater than an opacity of the inner layer, the outer layer defining at least one aperture, the inner layer and the cover defining a first interior region, the inner layer and the cover defining a second interior region; and a light module encapsulated within the first interior region, the light module configured to send light through the cover, through the inner layer, through the second interior region of the air-tight object, and through the at least one aperture of the outer layer, wherein the cover is disposed between the light module and the second interior region.

2. The apparatus as claimed in claim 1, wherein the second interior region is an inflatable region.

3. The apparatus as claimed in claim 1, wherein the inner layer includes a first portion and a second portion, wherein the first and second portions together define the second interior region, and the second portion and the cover together separate the first interior region from the second interior region.

4. The apparatus as claimed in claim 3, wherein the second portion mounts directly to the cover.

5. The apparatus as claimed in claim 3, wherein the first portion, the second portion and the cover together define the second interior region.

6. The apparatus as claimed in claim 1, wherein the cover engages an inner surface of the inner layer to secure the light module to the inner layer.

7. The apparatus as claimed in claim 1, wherein the cover engages the inner layer via a threaded engagement, a snap-fit, a friction-fit, or an adhesive.

8. The apparatus as claimed in claim 1, wherein the cover engages the inner layer at a recess defined by the inner layer.

9. The apparatus as claimed in claim 1, wherein the cover is translucent.

* * * * *